United States Patent [19]

Bovellan

[11] Patent Number: 5,244,248
[45] Date of Patent: Sep. 14, 1993

[54] FRONT PART FOR MOTOR VEHICLE
[75] Inventor: Kent Bovellan, Trollhättan, Sweden
[73] Assignee: Saab Automobile Aktiebolag, Sweden
[21] Appl. No.: 777,264
[22] PCT Filed: Apr. 2, 1991
[86] PCT No.: PCT/SE91/00241
  § 371 Date: Nov. 25, 1991
  § 102(e) Date: Nov. 25, 1991
[87] PCT Pub. No.: WO91/15391
  PCT Pub. Date: Oct. 17, 1991

[30] Foreign Application Priority Data

Apr. 2, 1990 [SE] Sweden .................. 9001186

[51] Int. Cl.[5] .......................... B62B 25/08
[52] U.S. Cl. ........................ 296/194; 296/188
[58] Field of Search ............... 296/194, 187, 188, 189, 296/204

[56] References Cited

U.S. PATENT DOCUMENTS

| 4,406,343 | 9/1983 | Harasaki | 180/297 |
| 4,560,198 | 12/1985 | Katano et al. | 296/185 |
| 4,573,734 | 3/1986 | Gass | 296/189 |
| 4,753,315 | 6/1988 | Fujisaki et al. | 180/299 |
| 4,763,948 | 8/1988 | Harasaki | 296/194 |
| 4,909,565 | 3/1990 | Harasaki et al. | 296/189 |
| 5,024,482 | 6/1991 | Harasaki et al. | 296/194 |
| 5,031,958 | 7/1991 | Fujita et al. | 296/194 |

FOREIGN PATENT DOCUMENTS 2713604 3/1977 Fed. Rep. of Germany.

Primary Examiner—Robert R. Song
Attorney, Agent, or Firm—Ostrolenk, Faber, Gerb & Soffen

[57] ABSTRACT

A front part for a motor vehicle, consisting of two side beams, two central beams and a subframe, in which front part there are also included struts connecting the side beams to the central beams as well as the central beams to beams forming part of the subframe. The front part in this manner allows a three-way force division through the struts. Very good stability and energy absorption in the event of collisions are thus obtained.

19 Claims, 1 Drawing Sheet

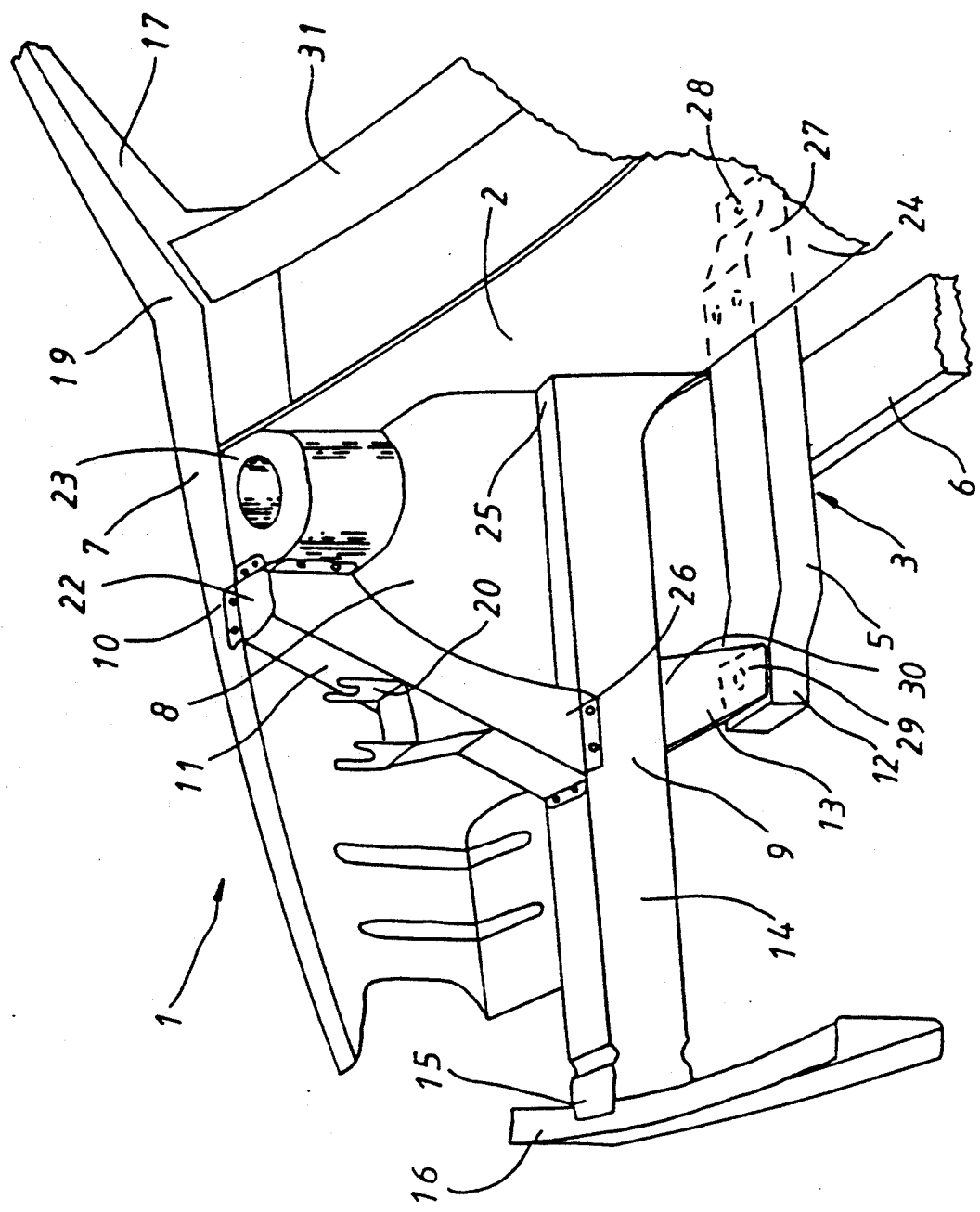

FRONT PART FOR MOTOR VEHICLE

The present invention relates to a front part for a motor vehicle and particularly beams so connected as to absorb collision energy.

STATE OF THE ART

A front structure in a motor vehicle with a cowl wall is designed in order to be capable of being deformed dynamically and to have in this connection as high an energy-absorbing capacity as possible. At the same time, it is desirable to prevent engine and transmission penetrating the cowl wall into the compartment, which could result in the latter collapsing. As always, a construction is sought which is of low weight and is not space-requiring.

In order to satisfy these requirements, the collision beams in the front structure must be designed so that on deformation as great a quantity of energy as possible per unit of weight is absorbed in a nevertheless controllable manner. The most common beam section for these applications is the rectangular hollow section. Correctly designed, this type of collision beam can be an effective energy-absorber by virtue of the fact that so-called folding buckling is made possible. Folding buckling is an absolute aim in dimensioning front structures at the same time as other deformation actions such as, for example, Euler buckling, must be made impossible.

Through the U.S. Pat. Nos. 4,406,343 (US Cl. 180-297) and 4,753,315 (US Cl. 180-299), front structures according to the patents have features described below. The patent specifications show front structures which include two side beams, two central beams lying below these and, arranged below these central beams, a subframe consisting of two beams and a cross beam connecting these.

The side beams, the central beams and the beams included in the subframe extend to the vehicle compartment and end on the whole in the same transverse vertical plane and have no significant force-transmitting connection to one another. As the central beams have recesses in order that the front structure be able to accommodate a transverse power plant and corresponding transmission, this can mean that, in the event of a collision which deviates slightly from a frontal collision, said front structure is subjected to such great inclined forces that it buckles. In this connection, there is the risk that the entire front structure will collapse. Nor do the front structures have a real deformation zone of fairly large size before the wheel housing, which is why, even at moderate speeds, they will exhibit serious damage, with high repair costs as a result.

THE SUMMARY OF THE INVENTION

The object of the present invention is to improve the passive safety of a vehicle by reducing the effect of high-speed collisions on the compartment. The invention shall further allow that a transverse power plant can be accommodated and protected in the engine room, and that the construction is otherwise simple to produce and, in the event of limited deformations, relatively simple to repair. At the same time it is to be endeavoured to satisfy the requirement for as low a weight as possible.

The aims and advantages of the invention are achieved in that each central beam is at a distance from its rear end rigidly connected on the one hand to a front end of an upwardly rearwardly inclined first strut which has a force-transmitting connection to the side beam which is arranged on the same side of the plane of symmetry, and on the other hand to a front end of a downwardly rearwardly inclined second strut which has a force-transmitting connection to a front beam part of the subframe beam which is arranged on the same side of the plane of symmetry.

By means of these features, the front structure has a stable deformation action as well as favourable energy-absorbing properties in relation to the material consumption. The invention further makes possible simple manufacture of the front structure, since it comprises relatively few parts, which also makes it easier to repair damage to the front structure.

In a particularly advantageous embodiment of the invention, a beam section constitutes an extension of the central beam in front of the rigid connection of the struts to the central beam to form a front energy-absorbing deformation zone.

This front beam section can be simply dimensioned and designed for well-controlled energy absorption which can take place at a load level which is marginally lower than the level at which rearwardly-lying energy-absorbing front structure parts begin to be deformed, as a result of the support the central beam has from the struts. A three-way division thus means that the continued deformation also has a stable sequence with a uniform distribution of the load on the three beams. This means relatively great freedom in designing in particular the central beam to take into consideration the requirements for adaptation of its extent and shape in order to make possible installation of the power plant of the vehicle.

The deformation sequence can be divided into three main stages: deformation of shock absorber and yielding in the structure, deformation of deformation element (the front part of central beams), and deformation of the mainly straight beam structure. The first two stages leave no damages or little relatively easily dealt with damage, on the rearwardly-lying structure. The straight beam structure which is made use of in the third stage is deformed stably as a result of the interconnection to the struts and gives rise to a favourable folding buckling without any interference which could lead to Euler buckling of the beams.

The subframe, which is included in the front part and which contributes to the good collision properties of the construction through its beam construction, also makes it possible to preassemble a large part of the power plant of the vehicle into a unit on the lower frame which is subsequently mounted in the front part. This makes it possible, moreover, to test-drive the power plant before the frame is mounted.

Further characteristics and advantages emerge from the patent claims and the description following. In this, an advantageous embodiment of the invention is described with reference to the attached drawing.

DESCRIPTION OF THE DRAWING AND OF AN EXEMPLARY EMBODIMENT

In the FIGURE, one half of a front part which constitutes part of a passenger car with self-supporting body is shown. The front part includes a front structure 1 enclosing an engine space. The front structure 1 comprises on each side a longitudinal side beam 7, a longitudinal central beam 9 below and extending essentially parallel to the side beam and a first strut 11 which connects the side beam 7 to the central beam 9. The front structure 1 also comprises a front transverse shock absorber beam 16 (not related to shock absorbers in the suspension system), a front cowl wall 2, a subframe 3 below and extending essentially parallel to the central beam and, on each side of the front structure 1, a second strut 13 connecting the central beam 9 to the subframe 3.

The front structure is in principle symmetrical with a vertical plane of symmetry which runs in the longitudinal direction of the vehicle. The deviations from a perfect symmetry which the front structure 1 does show are conditional upon necessary adaptations to the different aspects of the power plant and the space requirements on its different sides. The differences affect inter alia the attachments for engine and transmission, which are arranged in the front structure. The side beams 7 and the central beam 9 are thus arranged on each side of the plane of symmetry. Henceforward the description is made with reference only to the one side of the front structure 1 shown in the figure, but it is thus implied that unless otherwise indicated the same situation applies on the second side.

In the mounted position of the front structure 1 in a passenger car, the cowl wall 2 separates the compartment space of the car from its engine space and the front part by a known method. The longitudinal side beam 7 is essentially straight and rearward of the beam is fixed at 10 at an upper end 22 of a first strut 11. The side beam 7 is at its rear end 19 rigidly connected to a rear windscreen beam 31 and a windscreen pillar 17. On its rear part, the side beam 7 is connected to a shock absorbing leg tower 23 with an attachment for a shock absorbing leg (not shown) which forms part of the front wheel suspension of the vehicle. The shock absorbing leg tower 23 is fixed at its lower part in the wheel housing 8.

The central beam 9 is essentially straight and horizontal with at its front end 15 a rigid connection to the shock absorber beam 16, while the rear end 25 is connected to a floor beam (not shown) in a floor part in the vehicle. The central beam 9 consists of a front beam section 14 intended to form an uninterrupted deformation zone. The length of this beam section 14 is in this embodiment approximately 40 cm, but it can be made longer or shorter depending on the spaces and the energy absorption capacity which are required. The beam section 14 is arranged in front of a front wheel housing 8 and can alternatively (not shown in figure) bear against the rear part of the central beam 9. The central beam 9 thus does not need (as is shown in the figure) to be in one piece.

The first strut 11 is fixed with its lower end 26 on the central beam 9 in such a manner that it is forwardly and downwardly inclined. In the event of a frontal collision, this means that a part of the load to which the central beam 9 is subjected is transmitted to the side beam 7. Arranged on this first strut 11 is an engine mounting 20 which in this manner has a stable and good connection to the shock absorbing leg tower 23.

For reasons of vibration, a corresponding attachment on the strut which is situated symmetrically in the second part of the engine room which is not reproduced in the figure is missing.

The subframe 3 comprises a longitudinal beam 5 and a transverse beam 6, the ends of which are fixed to the beam 5 and to its corresponding part on the other side of the plane of symmetry. The transverse beam 6 can be arranged on the front or rear ends 12 and 27 respectively of the beams 5. In another embodiment (not shown), a further transverse beam can be arranged in order to connect the two beams 5. The beam 5 is designed at its ends 12 and 27 respectively with bolt holes 28 for its rear mounting in the cowl plate 24 and front mounting in a lower end 29 of a strut 13 respectively. The strut 13 is at its upper end 30 fixed on the underside of the central beam 9 and is backwardly downwardly inclined. The two struts 11, 13 thus together form an essentially forwardly directed arrow. These struts 11, 13 can according to one embodiment (not shown here) be arranged in one piece with the side beam 7 (as far as the strut 11 is concerned) and with the central beam 9 (as far as the struts 13 are concerned) respectively. This constitutes an alternative to the struts 11, 13 and the beams 7, 9 being manufactured separately and then fixed to one another by means of welding or bolt connection to the configuration described above.

As was revealed earlier, after mounting of the front structure 1, the rear ends 25 of the central beams 9 are in force-transmitting connection with the longitudinal floor beams of the vehicle which form part of the compartment structure of the vehicle. In the event of a frontal collision, collision forces are thus transmitted partly to the compartment structure of the vehicle via the side beams 7, partly to the centrally situated longitudinal tunnel beam (not shown) of the vehicle via the beams 5 of the subframe 3 and partly to the floor beams (not shown) of the vehicle via the central beam 9. Via essentially transverse floor beams (not shown), the forces are also transmitted to sill beams (not shown) which usually form part of the vehicle and which laterally delimit a floor part arranged in the vehicle. The tunnel beam, the floor beams and the sill beams form part of the compartment structure which forms a deformation-resistant cage which surrounds the compartment and in the event of collision will remain intact and protect the passengers to the greatest possible extent.

In the event of a collision straight from the front, first the shock absorber system will absorb some of the energy. The body will also absorb energy, elastically and through yielding in the same. If the collision speed is so low (approximately 8 km/h) and thus the requirement, deriving from the collision, for energy absorption is correspondingly low, no further deformation will take place and the collision will not leave any visible deformations of body structures. If a greater energy absorption is required, the deformation continues and the front parts 14 of the central beams 9 begin to be deformed. This deformation takes place in this connection at a load level which is lower than the level at which rearwardly-lying energy-absorbing front structure parts begin to be deformed. In the event of a continued requirement for energy absorption, the central beams 9, via folding buckling, will absorb collision energy and, at the same time, the collision forces are conducted via the struts 11, 13 partly to the side beams 7 and partly down into the subframe 3.

By means of the advantageously straight design of the beams 9 and in particular their front ends 14, they can simply be dimensioned in order to carry out by means of folding buckling a well-controlled energy absorption. This can take place very safely at a load level which is marginally lower than the level at which rearwardly-lying front structure parts begin to be deformed. An essential contribution to this is the 3-way division which takes place after the first beam section 14 has carried out its well-controlled deformation. Said division takes place in front of the wheel housing 8 with the possibility for the strut 11 to rest against said wheel housing as well as against the shock absorbing leg tower 23 formed therefrom. At the same time, division in front of the wheel housing means that relatively good possibilities are afforded for changing the extent and shape of the rearwardly-lying part of the central beam 9 in order to accommodate a transverse power plant in the engine room as well as the front wheel suspension.

The exemplary embodiment described above is not to have a limiting effect for the invention since, within the scope of the inventive idea and the patent claims following, it can be modified in a number of embodiments. The elements which are designated as struts 7, 13 can thus constitute more or less integrated parts of the beams 5, 7, 9.

I claim:

1. A front part for a motor vehicle, the front part having a front structure for enclosing an engine space of the vehicle and for absorbing the energy of a collision, the front structure having a front that is toward the front of the vehicle and having a rear that is toward the compartment of the vehicle;

the front structure comprising:
a longitudinal central beam having a first front end toward the front of the front structure and having a first rear end extending to the vehicle compartment;
a transverse shock absorber beam connected to the first front end of the central beam and extending transversely to the vehicle front structure;
a side beam located above the central beam and having a respective second front end and having a respective second rear end extending to the vehicle compartment;
a subframe, including a subframe beam which is located below the central beam; the subframe beam having a respective third front end which is fixed to the vehicle front structure and having a respective third rear end which extends to the vehicle compartment;
a first strut having a lower fourth front end which is rigidly connected to the central beam at a location on the central beam forward of the first rear end; the first strut extending inclined both upwardly and rearwardly to the side beam; a first force transmitting connection between the first strut and the side beam;
a second strut having an upper fifth front end which is rigidly connection to the central beam at a location that is spaced forward of the first rear end of the central beam; the second strut extending inclined both downwardly and rearwardly to the subframe beam; and a second force transmitting connection between the second strut and the subframe beam.

2. The front part of a vehicle of claim 1, wherein both the first and the second struts are connected to the central beam at locations rearward of the first front end of the central beam.

3. The front part of a vehicle of claim 1, wherein the second strut is connected to the third front end of the subframe beam.

4. The front part of a vehicle of claim 1, wherein the first strut is connected to the side beam forward of the second rear end and forward of the vehicle compartment.

5. The front part of a vehicle of claim 4, wherein the second strut is connected to the third front end of the subframe beam.

6. The front part of a vehicle of claim 5, wherein both the first and the second struts are connected to the central beam at locations rearward of the first front end of the central beam.

7. The front part of a vehicle of claim 1, wherein the side beam extends essentially parallel to the central beam.

8. The front part of a vehicle of claim 1, wherein the subframe beam extends essentially parallel to the central beam.

9. The front part of a vehicle of claim 8, wherein the side beam extends essentially parallel to the central beam.

10. The front part of a vehicle of claim 9, wherein the front structure has a plane of symmetry running longitudinally from the front; on each side of the plane of symmetry, there is a respective one of the central beam, the side beam, the subframe beam, the first strut and the second strut, with each of the first and the second struts being connected to the respective beams at the respective side of the plane of symmetry at which each of the first and second struts is located.

11. The front part of a vehicle of claim 2, wherein the central beam has a front section in front of the rigid connections to the central beam of the first and the second struts forming an energy absorbing deformation zone of the central beam.

12. The front part of a vehicle of claim 11, wherein the central beam front section is integrated with the remainder of the central beam.

13. The front part of a vehicle of claim 1, further comprising a tower attached to the vehicle front structure for fixing a wheel suspension to the front structure, the first strut being connected to the side beam generally at the tower.

14. The front part of a vehicle of claim 13, wherein the first strut is connected to the side beam essentially directly in front of the tower.

15. The front part of a vehicle of claim 1, further comprising a housing in the front structure for a front wheel of the vehicle; the first strut being generally at the front wheel housing.

16. The front part of a vehicle of claim 15, wherein the first strut rest over a substantial part of its length against the front wheel housing.

17. The front part of a vehicle of claim 1, further comprising an attachment on the front strut for the power plant of the vehicle.

18. The front part of a vehicle of claim 1, wherein each of the central beam, the side beam and the subframe beam is connected to the compartment of the vehicle.

19. A front part for a motor vehicle, the front part having a front structure for enclosing an engine space of the vehicle and for absorbing the energy of a collision, the front structure having a front that is toward the front of the vehicle and having a rear that is toward the compartment of the vehicle;

the front structure having a plane of symmetry running longitudinally from the front of the vehicle; on each side of the plane of symmetry, the front structure respectively comprising:
a longitudinal central beam having a first front end toward the front of the front structure and having a first rear end extending to the vehicle compartment;

a transverse shock absorber beam connected to the first front end of the central beam and extending transversely to the vehicle front structure;

a side beam located above and extending essentially parallel to the central beam and having a respective second front end and having a respective second rear end extending to the vehicle compartment;

a subframe, including a subframe beam which is located below and extending essentially parallel to the central beam; the subframe beam having a respective third front end which is fixed to the vehicle front structure and having a respective third rear end which extends to the vehicle compartment;

a first strut having a lower fourth front end which is rigidly connected to the central beam at a location on the central beam forward of the first rear end; the first strut extending inclined both upwardly and rearwardly to the side beam; a first force transmitting connection between the first strut and the side beam;

a second strut having an upper fifth front end which is rigidly connected to the central beam at a location that is spaced forward of the first rear end of the central beam; the second strut extending inclined both downwardly and rearwardly to the subframe beam, and a second force transmitting connection between the second strut and the subframe beam.

* * * * *